(12) United States Patent
Li

(10) Patent No.: US 9,504,874 B2
(45) Date of Patent: Nov. 29, 2016

(54) SPEED ADJUSTMENT METHOD AND DEVICE FOR MOUNTAIN CLIMBING MACHINE WITHOUT EXTERNAL POWER

(75) Inventor: Jun Li, Zibo (CN)

(73) Assignee: SHAN DONG HUIKANG SPORT EQUIPMENT CO., LTD., Zibo, Shandong (CN)

( * ) Notice: Subject to any disclaimer, the term of this patent is extended or adjusted under 35 U.S.C. 154(b) by 34 days.

(21) Appl. No.: 14/413,712

(22) PCT Filed: Aug. 20, 2012

(86) PCT No.: PCT/CN2012/001110
§ 371 (c)(1),
(2), (4) Date: Apr. 7, 2015

(87) PCT Pub. No.: WO2014/008618
PCT Pub. Date: Jan. 16, 2014

(65) Prior Publication Data
US 2015/0209618 A1    Jul. 30, 2015

(30) Foreign Application Priority Data

Jul. 11, 2012 (CN) .......................... 2012 1 0240469

(51) Int. Cl.
| | |
|---|---|
| *A63B 24/00* | (2006.01) |
| *A63B 22/02* | (2006.01) |
| *A63B 71/06* | (2006.01) |
| *A63B 21/068* | (2006.01) |
| *A63B 22/00* | (2006.01) |
| *F03G 5/02* | (2006.01) |

(52) U.S. Cl.
CPC ....... *A63B 24/0087* (2013.01); *A63B 21/0054* (2015.10); *A63B 21/068* (2013.01); *A63B 22/0015* (2013.01); *A63B 22/02* (2013.01); *A63B 22/025* (2015.10); *A63B 22/0228* (2015.10); *A63B 22/0242* (2013.01); *A63B 71/0619* (2013.01); *F03G 5/025* (2013.01); *A63B 22/0023* (2013.01); *A63B 2022/002* (2013.01); *A63B 2024/0065* (2013.01); *A63B 2024/0093* (2013.01); *A63B 2220/36* (2013.01); *A63B 2220/803* (2013.01); *A63B 2220/805* (2013.01); *A63B 2225/15* (2013.01)

(58) Field of Classification Search
CPC .............. A63B 24/00; A63B 24/0062; A63B 24/0087; A63B 22/02; A63B 22/0015; A63B 22/0023; A63B 22/0242; A63B 22/0228; A63B 22/025; A63B 71/0619; A63B 2024/0065; A63B 2024/0093; A63B 2220/36; A63B 2220/803; A63B 2220/805; A63B 21/053; A63B 21/0178
See application file for complete search history.

(56) References Cited

U.S. PATENT DOCUMENTS

| | | | |
|---|---|---|---|
| 2001/0011052 A1* | 8/2001 | Shu .................... | A63B 21/0053 482/2 |
| 2003/0166434 A1* | 9/2003 | Lopez-Santillana .......... | A63B 21/0053 482/52 |
| 2012/0007367 A1* | 1/2012 | Chang .............. | A63B 21/00178 290/1 R |

*Primary Examiner* — Glenn Richman
(74) *Attorney, Agent, or Firm* — Raymond Y. Chan; David and Raymond Patent Firm

(57) ABSTRACT

A mountain climbing machine, which does not require connecting with an external electrical power source, includes a running belt, front and rear rollers, and a generator operatively linked to one of the front and rear rollers for generating electrical power when the running belt is running, wherein a rotational speed of said generator is controlled by a consumption of the electrical power generated from the running belt so as to provide a resistance force at one of the front and rear rollers to maintain the running belt at a constant speed without connecting to the external electrical power source.

9 Claims, 6 Drawing Sheets

SPEED ADJUSTMENT METHOD AND DEVICE FOR MOUNTAIN CLIMBING MACHINE WITHOUT EXTERNAL POWER

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to an aerobic fitness equipment, and more particular to a speed adjustment method and device for a mountain climbing machine.

Description of Related Arts

There are two types of existing treadmills, i.e. a mechanical type and an electric type. Accordingly, the mechanical type treadmill is an active type treadmill without using an external electrical power source. The speed of the mechanical type treadmill is determined by the running speed of the trainer, and the change of the speed of the mechanical type treadmill is adjusted by the change of the speed of the trainers. In other words, the speed of the mechanical type treadmill cannot be controlled and programmed electronically. Therefore, the result of using the mechanical type treadmill for the trainer cannot be optimized without the customized program. In addition, the mechanical type treadmill, especially for a mountain climbing machine, has a tilted running belt, such that the trainer is running on the tilted running belt in an uphill manner. Due to the gravity and the weight of the trainer, the running speed of the trainer will become faster and faster when running on the tilted running belt. As a result, the trainer cannot control or customize the constant speed of the mountain climbing machine. In other words, the trainer may overtrain with faster speed or under-train with slower speed of the mountain climbing machine. The electric type treadmill is a passive type treadmill, wherein the trainer can customize the running speed of the treadmill to fit the time for exercising in response to the physical conditions of the trainer. Therefore, the trainer is guided to run on the running belt at the constant speed to effectively enhance the training effect. However, the electric type treadmill must be incorporated with a motor to provide a power to drive the running belt at a constant speed. Therefore, it is a high electrical power consumption machine comparing with the mechanical type treadmill.

SUMMARY OF THE PRESENT INVENTION

The invention is advantageous in that it provides a solution to the active type treadmill with a speed adjustment, so as to effectively enhance the training effect for the trainer. Accordingly, a speed adjustment method and device has advantages of having low power consumption and requiring no external electrical power source.

According to the present invention, the foregoing and other objects and advantages are attained by a speed adjustment method and device for a mountain climbing machine without an external electrical power source. The mountain climbing machine comprises a running belt having one end tilted to form a certain slope with respect to the ground, wherein the running belt is actuated when the user runs on the running. The speed adjustment comprises a generator operatively linked to a front roller or a rear roller at the running belt. The generator will generate electric power while the running belt is operated, wherein the rotational speed of the generator can be controlled by the consumption of the above mentioned electric power, such that the generator provide resistance forces to the front and rear rollers so as to maintain the running belt operating at a constant speed.

According to the preferred embodiment of the present invention, the electric power generated by the generator is completely consumed by an electronic loading module.

According to the preferred embodiment of the present invention, portions of the electric power generated by the generator is stored into the rechargeable battery module, and the rest portions of the electric power is consumed by the electronic loading module.

According to the preferred embodiment of the present invention, all of the electric power generated by the generator is stored into the rechargeable battery module.

The mountain climbing machine without an external electrical power source comprises a machine body, a supporting base, which is located at a bottom portion of the machine body, having a tilted front end and a rear end, and a running belt mounted on a front and rear roller of the supporting base to connect with the generator through a transmission unit, wherein the generator is operatively linked to the replaceable battery module and the electric loading machine through a control circuit.

According to the preferred embodiment of the present invention, the generator is operatively linked to the electronic loading module and the rechargeable battery module through the control circuit, wherein the control circuit comprises a single-chip module, a first driving module, a second driving module, a charge-control module, and a voltage and current detecting module. An output of the single-chip module is operatively linked to the first driving module and the second driving module. An output of the first driving module is operatively linked to an electronic loading module. The second driving module is operatively linked to the charge-control module, wherein an output of the charge-control module is operatively linked to the electronic loading module. A voltage and current detecting module is operatively linked to the electronic loading module and the charge-control module, and the generator is operatively linked to the electronic loading module, the charge-control module, and the voltage and current detecting module respectively.

According to the preferred embodiment of the present invention, the generator is operatively linked to the electronic loading module through the control circuit, wherein the control circuit comprises the single-chip module, the first driving module, and the voltage and current detecting module, wherein the output of the single-chip module is operatively linked to the first driving module, and the output of the first driving module is operatively linked to the electronic loading module, and the voltage and current detecting module is operatively linked to the electronic loading module, and the generator is connected to the electronic loading module and the voltage and current detecting module respectively.

According to the preferred embodiment of the present invention, the generator is connected to the battery module through the control circuit, wherein the control circuit comprises the single-chip module, the second driving module, the charge-control module, and the voltage and current detecting module, wherein the output of the single-chip module is operatively linked to the second driving module, and the second driving module is operatively linked to the charge-control module, and the output of the charge-control module is operatively linked to the rechargeable battery module, and the voltage and current module is operatively linked to the charge-control module, and the generator is operatively linked to the charge-control module and the voltage and current detecting module respectively.

According to the preferred embodiment of the present invention, a rotational speed sensor is provided at the front roller, the rear roller, or the shaft of the generator, wherein the rotational speed sensor is operatively linked to the single-chip module.

According to the preferred embodiment of the present invention, the first driving module comprises a first D/A converting module and a first driving resistance, and the second driving module comprises a second D/A converting module and a second driving resistance.

Accordingly, the first driving module can only be the first D/A converting module, and the second driving module can only be the second D/A converting module.

The rotational speed sensor can be a photoelectric sensor, a capacitive type sensor, a variable reluctance sensor, or a Honeywell single-pole switch, but it is not limited to the above-mentioned sensors, which can be other types of speed detecting devices.

The rotational speed sensor of the present invention is preferably, but not limited to, a Honeywell single-pole switch AH AH3144E. The Honeywell single-pole switch has a magnetic working valve value (Bop). If the magnetic density of the Honeywell single-pole switch is larger than the working valve value (Brp), an output transistor will turn on; while the magnetic density of the Honey single-pole switch is lower than the working valve value (Brp), the output transistor will turn off. A permanent magnet is installed on a roller, wherein while the permanent magnet is passing through the Honeywell single-pole switch, an output signal number "1" is generated by the Honeywell single-pole switch. In generally, the rotational speed of the shaft of the generator can be calculated by recording the frequent of the output signal number "1" in per unit of time.

The transmission can be a driving belt, a driving chain or a driving gear.

When the rotational speed sensor is provided on the front roller, the rear roller, or the shaft of the generator, the voltage and current detecting module is installed within the control circuit. The voltage signal from the generator is sent to the single-chip module through the feedback resistance, such that the voltage signal is converted into digit signals through the A/D converter integrated within the chip of the single-chip module. The digit signal is proportional to the rotational speed of the generator, so as to calculate the rotational speed of the generator. Therefore, the rotational speed of the roller and the operation speed of the running belt can be measured, and in such manner that the consumption of the generated electric power can be selectively controlled to provide suitable amounts of resistance forces to the running belt, so as to remain the running belt operating at a constant speed.

When the generator is operatively linked to the electronic loading module and the rechargeable battery module, the voltage signals are sent back to the single-chip module from the rechargeable battery module as well as the voltage signals are converted into digit signals through the A/D converter integrated within the single-chip module. In the control circuit, when the rechargeable battery module is detected to have low battery power, the electronic loading module will stop working or reduces the flow rate of the current. Then, the current from the generator is fully used to charge the rechargeable battery module. While the battery power of the rechargeable battery module is gradually increased, the electric power assigned to charge the rechargeable battery module in the control circuit is gradually reduced. The rest portions of the electric power can be consumed by the electronic loading module. While the rechargeable battery module is charged, the entire loading of the mountain climbing machine of the present invention is that the electric loading and the electrical consumption of rechargeable battery module. During charging the rechargeable battery module, the single-chip module is controlled to adjust the proportion of the electric power being used for electric loading and the electric power being used to charge the rechargeable battery module, so as to maintain the whole loading capacity to meet the requirements for the generator to provide resistances.

Principles of the present invention is illustrated as followings:

When a trainer is running on the running belt with a certain slope, the trainer will naturally slide down because of the small sliding friction via the roller and the gravity of the trainer's weight, wherein the speed of the running belt is gradually increased by the weight of trainer, i.e. the gravity force with respect to the weight of the trainer, and the acceleration of the running speed for the trainer. In order to control the speed of the running belt, a generator is provided to generate a resistance force at the front or rear roller for controlling the running belt at a constant speed.

The loading amount of the generator can be directly applied at the power inputting shaft of the generator, wherein the resistance force applied on the front and/or rear rollers connected to the shaft of the generator can be adjusted by adjusting the loading amount of the generator. In other words, the speed of the running belt can be adjusted by adjusting the resistance force applied on the front and/or rear rollers.

The loading of the generator can be the electric loading (the consumption of the electric power generated by the generator), or can be converted to the direct current provided to the control circuit of the present invention and to store into the rechargeable battery module.

When the rechargeable battery module is detected in a low power status via the control circuit, the electric power generated by the output of the generator is used to charge the rechargeable battery module. Conversely, while the power of the rechargeable battery module is gradually increased, portions of the electric power generated by the generator is provide to charge the rechargeable battery module, and the rest portions of the electric power is consumed by the variable electronic loading module.

The electric power generated by the generator, as well as that the trainer is running on the running belt, not only can be converted into the direct current to be stored into the rechargeable battery module, but also can be converted into different voltages through the control circuit. In addition, the electric power can be used to different types of external electric appliances or feedback appliances into the grid to achieve green energy production.

The present invention has advantages of flexible in use, wide in application, saving in energy, having good fitness effects. The running belt of the present invention is operated by the gravity of the trainer to serve as an activation power to activate the mountain climbing machine, so as to achieve energy saving feature. The trainer can select suitable running speed based on his or her physical condition. The electric power is generated by the generator to provide suitable resistance force to the front roller and/or the rear roller, so as to achieve the speed adjustment of the running belt. Therefore, the trainer is guided to run at the set speed of the running belt to reach the best fitness effects. The slope of the supporting base can be varied within a certain range, and the slope thereof can be set to adapt to different fitness requirements.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

The following description is disclosed to combine drawings and preferred embodiments to further illustrate the present invention.

Figure 1:
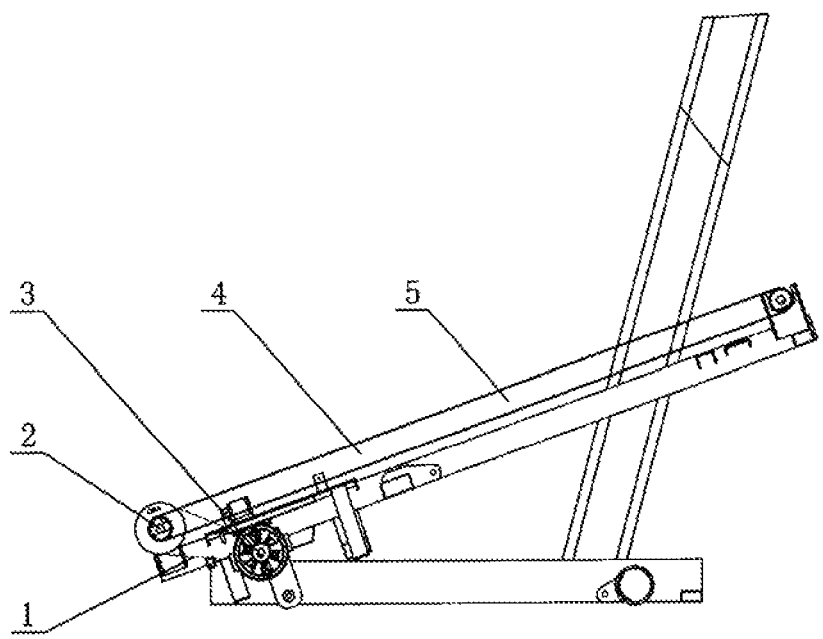
FIG. 1 is a side view of a mountain climbing machine according to a preferred embodiment of the present invention.

As shown in FIG. 1, a mountain climbing machine according to a preferred embodiment of the present invention is illustrated, wherein the mountain climbing machine comprises a machine body, a supporting base 5 having a front end and a rear end, a front roller mounted on the front end of the supporting base 5, a rear roller 2 mounted on the rear end of the supporting base 5, a running belt operatively coupled between the front roller and rear roller 2, and a generator 3 operatively linked to the rear roller 2 via a driving belt. Accordingly, the supporting base 5 is supported at a tilted manner that the front end of the supporting base 5 is located above the rear end thereof.

Figure 2:
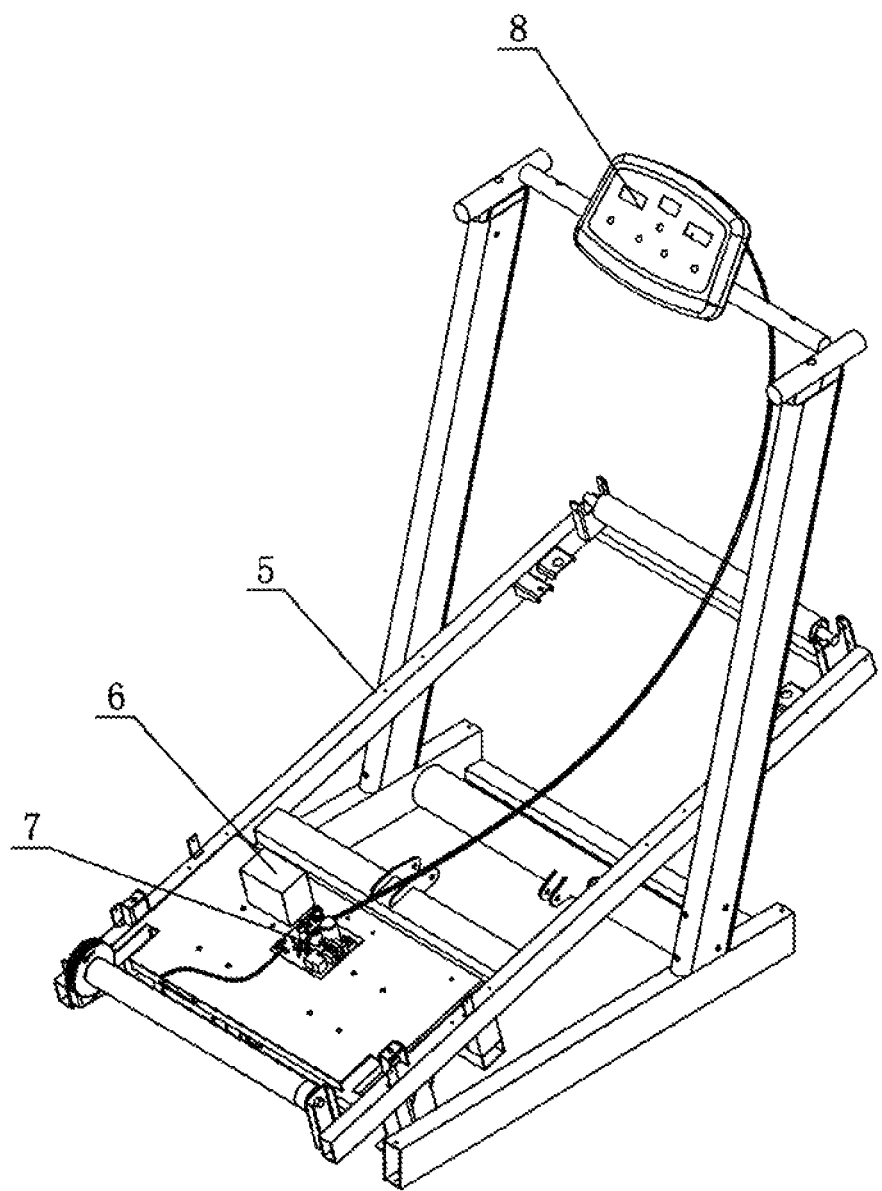
FIG. 2 is a perspective view of the mountain climbing machine according to the above preferred embodiment of the present invention, illustrating the generator, wherein the running belt is not shown in FIG. 2.

As shown in FIG. 2, the mountain climbing machine further comprises a rechargeable battery module 6 and a control circuit 7 provided at the supporting base 5, and a dashboard 8 mounted on the machine body and operatively linked to the control circuit 7.

Figure 3:
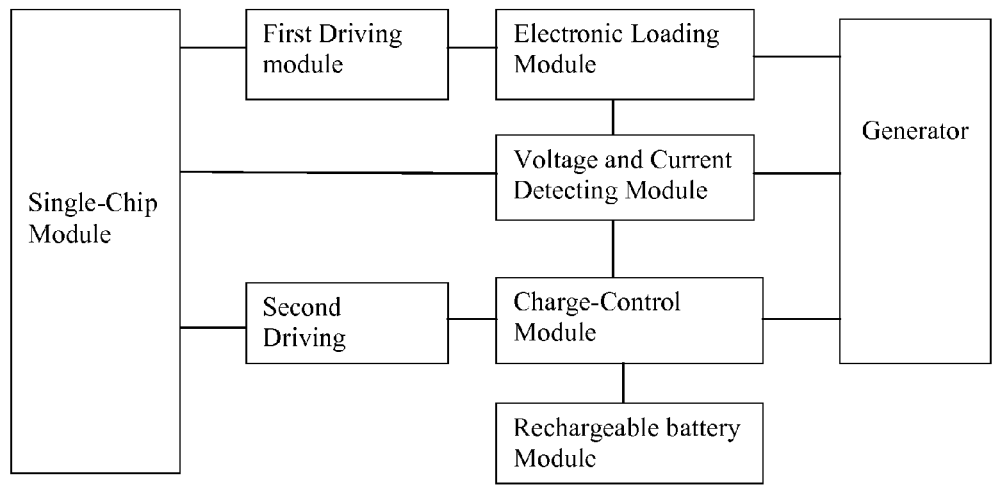
FIG. 3 is a block diagram of a control circuit of the mountain climbing machine according to a first preferred embodiment of the present invention.

As shown in FIG. 3, the control circuit 7 comprises a single-chip module connected to a first driving module and a second driving module, wherein a driving signal is sent from the single-chip module to the first and second driving modules. The control circuit 7 further comprises an electronic loading module and a charge-control module. The first driving module is operatively linked to the electronic loading module, wherein an output of the first driving module is able to control the strength of an electronic load of the electronic loading module. The second driving module is operatively linked to the charge-control module, wherein an output of the second driving module is able to control the strength of a charging current to the rechargeable battery module 6 through the charge-control module. The electronic loading module is operatively linked to the generator 3, wherein an output (an electric power) from the generator 3 is consumed through the electronic loading module. The charge-control module is operatively linked to the generator 3, wherein the electric power generated from the generator 3 is output to the rechargeable battery module 6 through the charge-control module. A voltage and current detecting module is operatively linked to the electronic loading module, the charge-control module, the generator 3, and the single-chip module, wherein the voltage and current detecting module is arranged to detect voltage and current signals of the generator 3, the electronic loading module, and the charge control module, and is arranged to sent the detected signals to the signal-chip module.

Figure 7:
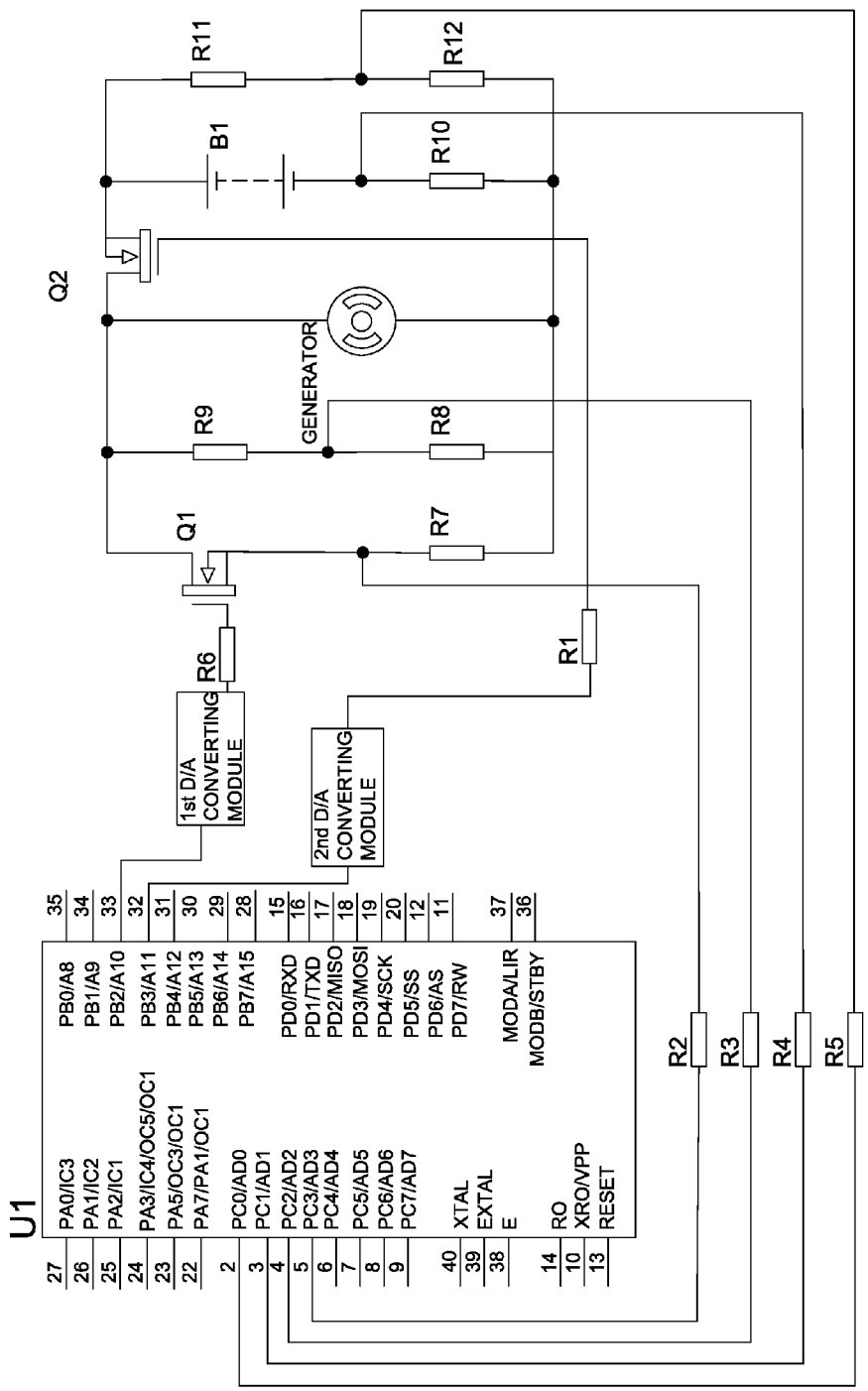
FIG. 7 is a schematic diagram of a control circuit according to the first preferred embodiment of the present invention.

As shown in FIG. 7, U1 is assigned as the signal-chip module; Q1 is assigned as the electronic loading module (IGBT); Q2 is assigned as the charge-control module (IGBT); B1 is assigned as the rechargeable battery module 6; R1 is assigned as a driving resistance for the electronic loading module; R2 is assigned as a driving resistance for the charge-control module; R2, R3, R3, R4 are assigned as feedback resistances; R8 and R9 are assigned as divider resistances for the generator 3, which are adapted to detect voltage signals sent from the generator 3; R11 and R12 are assigned as divider resistances for the rechargeable battery module 6, which are adapted to detect voltages signals stored into the rechargeable battery module 6; R1 and R6 are assigned as driving resistances for the first driving module and the second driving module respectively; and R7 and R10 are assigned as sampling resistances for current signals.

Referring to FIG. 7 of the drawings, the first driving module comprises a first D/A (digital to analog) converting module and the driving resistance R6 for the first driving module. The second driving module comprises a second D/A converting module and the driving resistance R1 for the second driving module. The electronic loading module is Q1, and the charge-control module is Q2. The divider resistances R8 and R9 are combined to form a voltage divider circuit of the generator 3, wherein the voltage signal from the generator 3 is transmitted to the signal-chip module through the feedback resistance R3. The divider resistance R11 and R12 are combined to form a voltage divider circuit of the rechargeable battery module 6, wherein the voltage signal from the rechargeable battery module 6 is transmitted to the signal-chip module through the feedback resistance R5. The current signals within an electronic loading return circuit are obtained through the sampling resistance R7, and then the current signals are transmitted to the signal-chip module through the feedback resistance R2. During a charging loop of the rechargeable battery module 6, the current signals are obtained through the sampling resistance R10, and then the current signals are transmitted to the signal-chip module through the feedback resistance R4.

While a trainer is running on the running belt of the mountain climbing machine, the generator will be activated via the movement of the running belt, wherein a voltage is generated at an output end of the generator 3. The voltage passes through the divider resistance R8 and R9 to produce the voltage signal, and then the voltage signal is transmitted to the signal-chip module through the feedback resistance R3. A A/D converter built-in with the single-chip module is arranged to convert the voltage signals into digital signals, wherein the rotational speed of the generator 3 is represented by the digital signals. When comparing the digital signals with an input digit signals set by the dashboard, a control signal will be sent by the generator 3 to the first D/A converting module. Then, the control signal is converted into a voltage signal by the first converting module to control the strength of the electronic loading module Q1. The strength of the electronic loading module Q1 directly controls to the rotational speed of the generator 3. In other words, while the rotational speed of the generator is increased, the electronic loading for the single-chip module will be increased. Likewise, when the rotational speed of the generator is decreased, the electronic loading for the single-chip module will be reduced. As a result, the rotational speed of the generator 3 will be maintained in a constant manner.

While the terminal of the rechargeable battery module 6 receives a low voltage signal, i.e. lower than the standard level, the signal-chip module can control the strength or frequency of the charge-control module Q2 to charge the rechargeable battery module 6. While the terminal of the rechargeable battery module 6 receives a high voltage signal, the signal-chip module can control to decrease the strength or frequency of the charge-control module to charge the rechargeable battery module 6, so as to prevent rechargeable battery module 6 being overcharged. During the charging loop, the voltage signals are obtained through the sampling resistance R10, and the voltage signals are sent to the signal-chip module through the feedback resistance R4, so as to control the charging condition of the charging loop.

Embodiment 2

Figure 4:
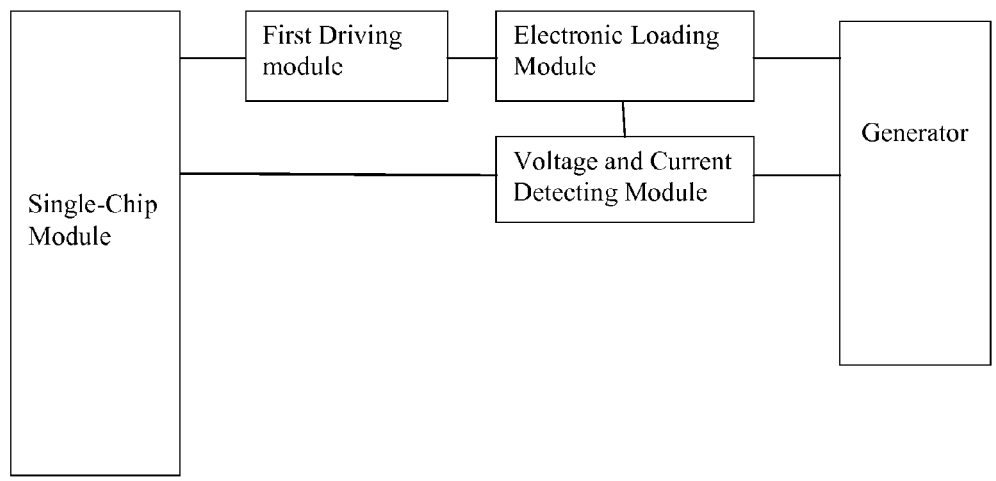
FIG. 4 is a block diagram of a control circuit of the mountain climbing machine according to a second preferred embodiment of the present invention.

As shown in FIG. 4, a control circuit according to a second preferred embodiment of the present invention is illustrated, wherein the control circuit comprises the signal-chip module is connected to the first driving module, wherein the driving signal is generated from the signal-chip module and is sent to the first driving module. The first driving module is operatively linked to the electronic loading module, wherein the strength of the electronic loading module is able to be controlled by the first driving module. The electronic loading module is operatively linked to the generator, wherein an electric power generated from the generator is completely consumed through the electronic loading module. The voltage and current detecting module is operatively linked to the electronic loading module, the generator, and the signal-chip module respectively, wherein the voltage and current detecting module is arranged to detect voltage and current signals of the generator, the electronic loading module, and the charge control module, and then the voltage and current signals are transmitted to the signal-chip module.

According to the second preferred embodiment of the present invention, the circuit configuration is the same as the first embodiment excepting for the second driving module, the charge control module, and the battery module. In other words, the control circuit of the second preferred embodiment of the present invention does not include the second driving module, the charge control module, and the battery module.

According to the second preferred embodiment of the present invention, the electric power generated from the generator is only consumed by the electronic loading module.

Embodiment 3

Figure 5:
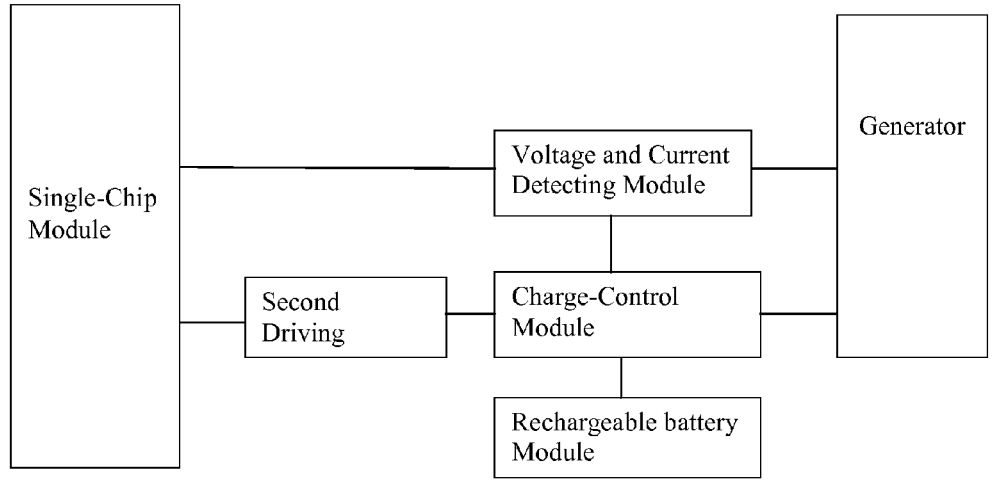
FIG. 5 is a block diagram of a control circuit of the mountain climbing machine according to a third preferred embodiment of the present invention.

As shown in FIG. 5, a control circuit according to a third preferred embodiment of the present invention is illustrated, wherein the control circuit comprises the single-chip module operatively linked to the second driving module, wherein the driving signals are sent to the second driving module by the single-chip module. The second driving module is operatively linked to the charge-control module, wherein the output of the second driving module is able to control the strength of the charging current which is sent from the charge-control module to the rechargeable battery module for charging the rechargeable battery module. The charge-control module is operatively linked to the generator, wherein the electric power generated from the generator is transmitted to the replaceable battery module through the charge-control module. The voltage and current detecting module is operatively linked to the electronic loading module, the charge control module, the generator, and the single-chip module respectively, wherein the voltage and current detecting module is adapted to detect voltage and current signals of the generator and the charge control module, and then the voltage and current signals are transmitted to the signal-chip module.

According to the third preferred embodiment of the present invention, the circuit configuration is the same as the first preferred embodiment excepting for the first driving module and the electronic loading module. In other words, the third preferred embodiment of the present invention does not include the first driving module and the electronic loading module.

According to the third preferred embodiment of the present invention, the electric power generated from the generator is only used to charge the rechargeable battery module.

Embodiment 4

Figure 6:
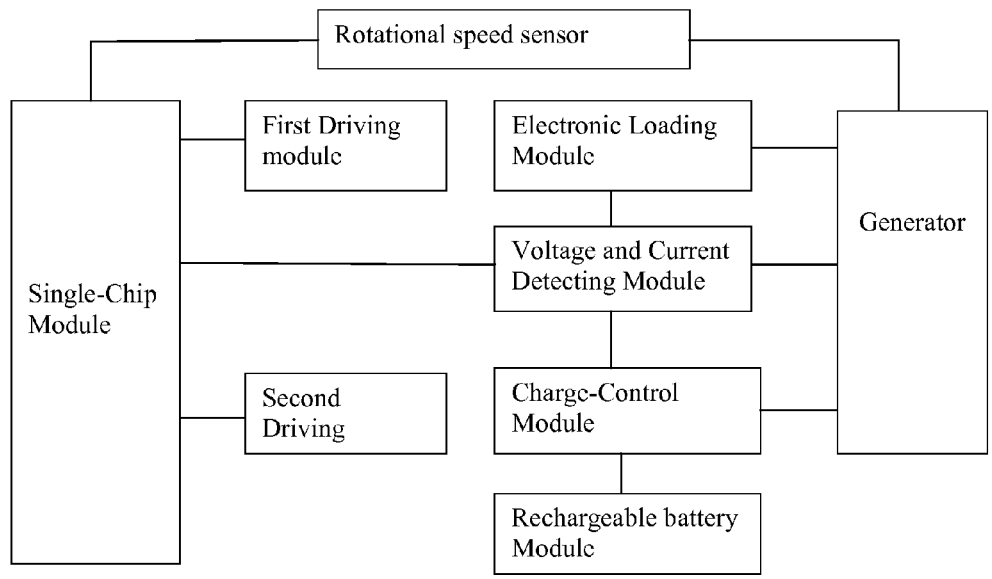
FIG. 6 is a block diagram of a control circuit of the mountain climbing machine according to a fourth preferred embodiment of the present invention.
Figure 8:
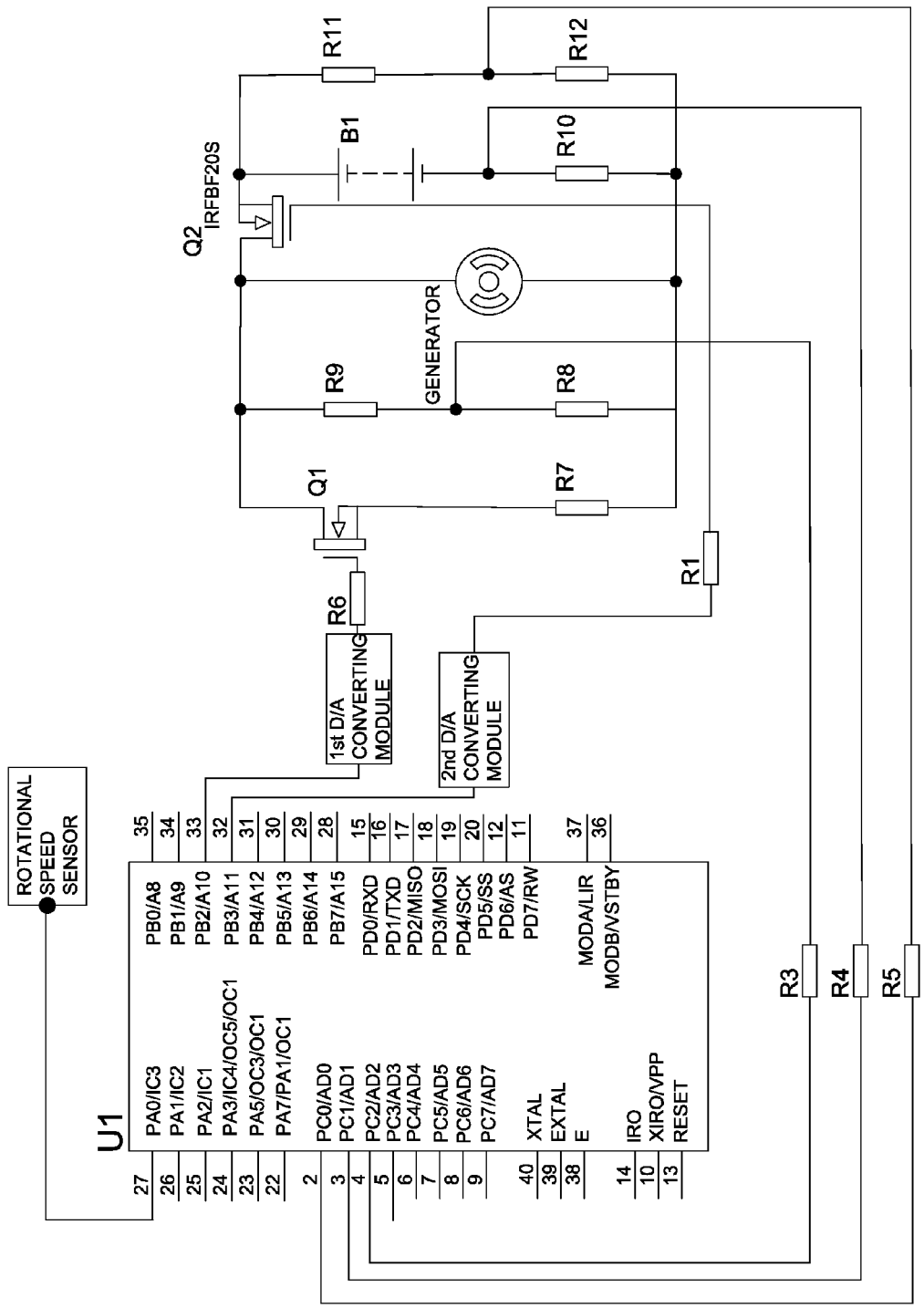
FIG. 8 is a schematic diagram of a control circuit according to the fourth preferred embodiment of the present invention.

As shown in FIG. 6 and FIG. 8, a control circuit according to a fourth preferred embodiment of the present invention illustrates a modification of the first embodiment, wherein the control circuit further comprises a rotational speed sensor operatively linked to the signal-chip module, which is provided at a shaft of the generator. The fourth embodiment of the present invention has the same component of the first preferred embodiment, wherein the rotational speed sensor is an additional component in the fourth embodiment.

According to the fourth embodiment of the present invention, the rotational speed of the shaft of the generator is able to be detected by the signal-chip module through the rotational speed sensor.

According to the fourth embodiment of the present invention, the rotational speed sensor is a Honeywell single-pole switch AH AH3144E. The Honeywell single-pole switch has a magnetic working valve value (Bop). If the magnetic density of the Honeywell single-pole switch is larger than the working valve value (Brp), an output transistor will turn on. When the magnetic density of the Honey single-pole switch is lower than the working valve value (Brp), the output transistor will turn off. A permanent magnet is installed on a roller, such that while the permanent magnet is passing through the Honeywell single-pole switch, an output signal number "1" is generated by the Honeywell single-pole switch. In general, the rotational speed of the shaft of the generator can be calculated by recording the frequent of the output signal number "1" in per unit of time.

The present invention is not limited to the above mentioned embodiment. As described in the fourth embodiment, the generator can only connected to the electronic loading module or the battery module through the charge-control module. The rotational speed sensor can be installed at the front roller or the rear rollers.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A mountain climbing machine, which does not require connecting with an external electrical power source, comprising:
a running belt with a predetermined slope for a user running thereon,
front and rear rollers operatively coupled at said running belt; and
a speed adjustment device, which comprises:
a generator operatively linked to one of said front and rear rollers for generating electrical power when said running belt is running;
a loading means which comprises at least one of an electronic loading module and a rechargeable battery module; and
a control circuit operatively linked to said generator and said loading means for controllably directing said electrical power to at least one of said electronic loading module and said rechargeable battery module, wherein said generator is operatively linked to said electronic loading module and said battery module through said control circuit which comprises a single-chip module, a first driving module, a second driving module, a charge-control module, and a voltage and current detecting module, wherein an output of said single-chip module is operatively linked to said first driving module and said second driving module, wherein an output of said first driving module is operatively linked to said electronic loading module, wherein said second driving module is operatively linked to said charge-control module, wherein an output of said charge-control module is operatively linked to said electronic loading module, wherein said voltage and current detecting module is operatively linked to said electronic loading module and said charge-control module, wherein said generator is operatively linked to said electronic loading module, said charge-control module, and said voltage and current detecting module.

2. The mountain climbing machine, as recited in claim 1, wherein said speed adjustment device further comprises a rotational speed sensor provided at one of said front roller, said rear roller, and a shaft of said generator, wherein said rotational speed sensor is operatively linked to said single-chip module.

3. The mountain climbing machine, as recited in claim 1, wherein said first driving module comprises a first D/A converting module and a first driving resistance, wherein said second driving module comprises a second D/A converting module and a second driving resistance.

4. A mountain climbing machine, which does not require connecting with an external electrical power source, comprising:
a running belt with a predetermined slope for a user running thereon,
front and rear rollers operatively coupled at said running belt; and
a speed adjustment device, which comprises:
a generator operatively linked to one of said front and rear rollers for generating electrical power when said running belt is running;
a loading means which comprises at least one of an electronic loading module and a rechargeable battery module; and
a control circuit operatively linked to said generator and said loading means for controllably directing said electrical power to at least one of said electronic loading module and said rechargeable battery module, wherein said generator is operatively linked to said electronic loading module through said control circuit which comprises a single chip module, a first driving module, and a voltage and current detecting module, wherein an output of said single-chip module is operatively linked to said first driving module, wherein an output of said first driving module is operatively linked to said electronic loading module, wherein said voltage and current module is operatively linked to the electronic loading module, wherein said generator is operatively linked to said electronic loading module and said voltage and current detecting module.

5. The mountain climbing machine, as recited in claim 4, wherein said speed adjustment device further comprises a rotational speed sensor provided at one of said front roller, said rear roller, and a shaft of said generator, wherein said rotational speed sensor is operatively linked to said single-chip module.

6. The mountain climbing machine, as recited in claim 4, wherein said first driving module comprises a first D/A converting module and a first driving resistance, wherein said second driving module comprises a second D/A converting module and a second driving resistance.

7. A mountain climbing machine, which does not require connecting with an external electrical power source, comprising:
a running belt with a predetermined slope for a user running thereon,
front and rear rollers operatively coupled at said running belt; and a speed adjustment device, which comprises:

a generator operatively linked to one of said front and rear rollers for generating electrical power when said running belt is running;

a loading means which comprises at least one of an electronic loading module and a rechargeable battery module; and a control circuit operatively linked to said generator and said loading means for controllably directing said electrical power to at least one of said electronic loading module and said rechargeable battery module, wherein said generator is operatively linked to said rechargeable battery module through said control circuit which comprises a single-chip module, a second driving module, a charge-control module, and a voltage and current detecting module, wherein an output of said single-chip module is operatively linked to said second driving module, wherein said second driving module is operatively linked to said charge-control module, wherein an output of said charge control module is operatively linked to said rechargeable battery module, wherein said voltage and current module is operatively linked to said charge-control module, wherein said generator is operatively linked to said charge control module and said voltage and current detecting module.

8. The mountain climbing machine, as recited in claim 7, wherein said speed adjustment device further comprises a rotational speed sensor provided at one of said front roller, said rear roller, and a shaft of said generator, wherein said rotational speed sensor is operatively linked to said single-chip module.

9. The mountain climbing machine, as recited in claim 7, wherein said first driving module comprises a first D/A converting module and a first driving resistance, wherein said second driving module comprises a second D/A converting module and a second driving resistance.

* * * * *